United States Patent [19]

Schweitzer

[11] Patent Number: 4,805,587
[45] Date of Patent: Feb. 21, 1989

[54] GAS GRILL

[75] Inventor: Ronald D. Schweitzer, Mansfield, Ohio

[73] Assignee: Universal Enterprises, Inc., Mansfield, Ohio

[21] Appl. No.: 170,005

[22] Filed: Mar. 18, 1988

[51] Int. Cl.⁴ .............................................. F24C 3/00
[52] U.S. Cl. ..................... 126/39 L; 126/41 R; 126/39 K; 99/340; 99/443 R
[58] Field of Search ................ 126/39 L, 39 R, 41 R, 126/25 R, 39 K; 99/391, 393, 339, 340, 444, 446, 447, 421 R

[56] References Cited

U.S. PATENT DOCUMENTS

| 2,905,077 | 9/1959 | Del Francia | 126/41 R |
| 3,012,496 | 12/1961 | Kelley et al. | 126/25 AA |
| 3,033,189 | 5/1962 | Clark | 126/25 AA |
| 3,033,190 | 5/1962 | Atkinson | 126/25 AA |
| 3,085,497 | 4/1963 | Statia, Sr. | 99/340 |
| 3,131,685 | 1/1962 | Bergfield | 126/25 AA |
| 3,134,320 | 5/1964 | Meyer | 99/340 |
| 3,298,301 | 1/1967 | Lowndes | 99/340 |
| 3,309,982 | 3/1967 | Surks | 99/420 |
| 3,386,433 | 6/1968 | Copeland et al. | 126/41 R |
| 3,448,679 | 6/1969 | Holka et al. | 99/443 R |
| 3,511,167 | 5/1970 | Holtkamp | 99/443 R |
| 3,657,996 | 4/1972 | Thompson | 99/443 R |
| 3,848,523 | 11/1974 | Galisz et al. | 126/25 R |
| 3,989,028 | 11/1976 | Berger | 126/41 R |
| 4,402,300 | 9/1983 | Houck | 126/41 R |

FOREIGN PATENT DOCUMENTS

| 566576 | 11/1958 | Canada | 126/39 L |
| 210420 | 12/1983 | Japan | 126/39 L |

Primary Examiner—James C. Yeung
Attorney, Agent, or Firm—Pearne, Gordon, McCoy & Granger

[57] ABSTRACT

A cooking grill assembly of high energy efficiency is disclosed. A gas burner arm heat source is oscillated through an arc of a variable amount in order to limit the heat source cooperation with the cooking grill to that area of the grill on which the food is to be cooked. A means to limit the heat source to this given area of the grill is provided and includes a motor, drive linkage, and variable stop means so that the arc of the burner tube oscillation is limited to the selected area. The foregoing abstract is merely a resume of one general application, is not a complete discussion of all principles of operation or applications, and is not to be construed as a limitation on the scope of the claimed subject matter.

13 Claims, 3 Drawing Sheets

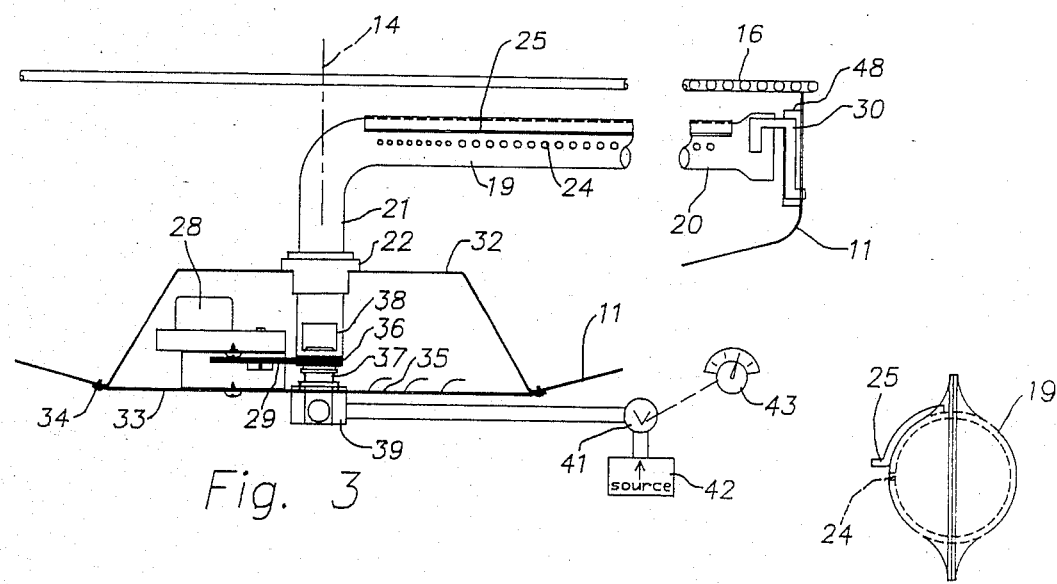

GAS GRILL

BACKGROUND OF THE INVENTION

A number of barbecued food cooking grills have been proposed, including those in which a pan for burning a fuel such as charcoal have been proposed with a supporting grill for the food, wherein the grill may be rotated by a motor. This construction is shown in a number of patents, e.g.. U.S. Pat. Nos. 3,134,320; 3,298,301; 3,131,685; 3,085,497; 3,012,496; 3,033,190; and 3,033,189. The latter patent is exemplary of the type of rotary grill for food which would have a high mass and inertia, and hence require a motor with enough power to overcome such high mass and inertia, especially with an unbalanced load on the grill.

U.S. Pat. No. 3,511,167 discloses a rotisserie spit for meat which may be oscillated over a small arc so as not to break a conductor wire to a thermal sensing probe in the meat. The means for effecting the reversal of rotation is not disclosed.

In the charcoal-fired cooking grills as shown in most of the first-mentioned group of patents, it is easy and practical for the cooking chef to prepare a charcoal fire of only the necessary size for the quantity of food to be cooked. Such charcoal fire can be placed in a large grill at one smaller location and the food on the grill is placed at that same smaller location. In recent years, gas-fired cooking grills have become more popular, either fired from a gas pipe or fired from a portable storage tank such as for propane. In the typical prior art gas cooking grill, the gas flame is from a large burner which covers substantially all of the grill area. When one wants to cook only a small amount of food on a large grill, this is quite wasteful of the heat source, which in this case is a gas flame.

SUMMARY OF THE INVENTION

The problem to be solved, therefore, is how to conserve the heat source when the amount of food to be cooked covers less than all of the surface of the grill.

This problem is solved by a cooking grill assembly comprising, in combination, a support having an axis, a grill carried relative to said support, a heat source carried relative to said support adjacent said grill and extending substantially perpendicularly to said axis to cooperate with any food on said grill, a bearing on said support substantially coaxial at said axis, the food to be cooked on the grill adapted to be disposed on a given area less than 100% of the area of the grill, means to limit the heat source to substantially said given area of said grill, said limiting means including a motor, drive linkage and variable means, said drive linkage connecting said motor to rotate one of said heat source and said grill in said bearing, and said variable means varying the effective area of cooperation of said heat source to said given area of said grill.

Accordingly, an object of the invention is to provide a food cooking grill with variable means varying the effective cooking area on the grill.

Other objects and a fuller understanding of the invention may be had by referring to the following description and claims, taken in conjunction with the accompanying drawing.

BRIEF DESCRIPTION OF THE DRAWING

FIG. 3 is an enlarged sectional view similar to FIG. 2;

FIG. 4 is an end view of the burner tube;

FIG. 5 is an enlarged plan view of a variable stop for the burner tube;

FIG. 6 is an elevational view of the stop of FIG. 5;

FIG. 7 is an enlarged plan view of the variable stop in a stop position;

FIG. 8 is an elevational view of the stop of FIG. 7;

DESCRIPTION OF THE PREFERRED EMBODIMENTS

Figure 1:
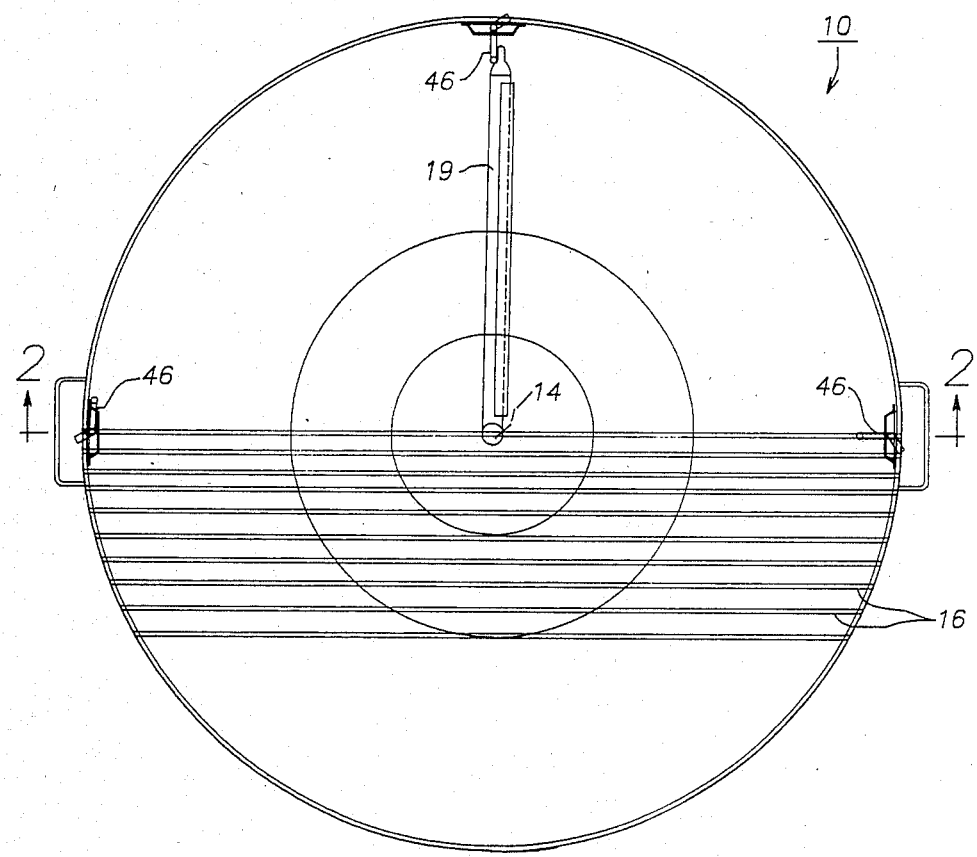
FIG. 1 is a plan view of a cooking grill embodying the invention.
Figure 2:
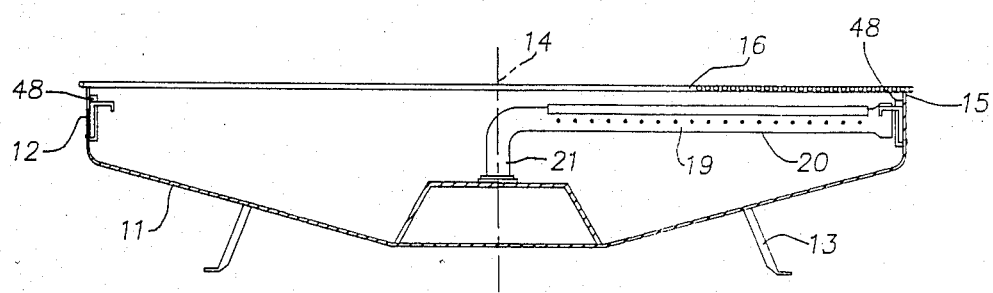
FIG. 2 is a sectional view on line 2—2 of FIG. 1.

FIGS. 1 to 8 illustrate a cooking grill 10 which includes a support 11. This support may be partially louvered or with baffles, or with air apertures 12, and is shown in the form of a closed bottom pan with legs 13. This support pan is shown as being circular and has an axis 14 which in this preferred embodiment is vertical. The upper rim 15 of the pan 11 supports a food cooking grill 16 and in this embodiment the grill 16 is also circular to conform to the circular shape of the pan 11. A heat source is provided to do the cooking of the food on the grill, and in this embodiment the heat source is carried relative to the support pan 11 and adjacent to the grill 16. The heat source in this embodiment is shown as a burner tube 19 which extends substantially perpendicularly to the axis 14. The burner tube extends to the axis 14 and in this embodiment is L-shaped with a long arm 20 and a short arm 21 on the axis 14. A bearing 22 is provided on the support pan 11 on the axis 14. This bearing establishes rotation of either the grill 16 or the burner tube 19, and in this embodiment it is the burner tube 19 which is journaled in the bearing 22 for rotation. The long arm 20 of the burner tube has burner ports 24 to emit gas for a flame for cooking the food on the grill. These burner ports are one vertical side of the tube, and in the preferred embodiment those ports closest to the axis 14 may be smaller than those more distant from the axis. A drip shield 25 is secured to the long arm 20 and extends slightly outwardly over the burner ports 24 so as to prevent the ports from being fouled by any drippings from the food being cooked.

The grill might be 24 inches in diameter, for example, and in many cases the food to be cooked does not cover the entire grill 16 but only a given area less than 100% of the surface area of the grill 16. The present invention includes a means to limit the heat source to substantially that given area of the grill. This limiting means includes generally a motor 28, drive linkage 29, and variable means 30. The central portion of the pan support 11 is raised to form a housing 32 on which the bearing 22 is mounted. An enclosure plate 33 is secured with fasteners 34 to this pan support 11 and the motor 28 is mounted on this enclosure plate 33. The enclosure plate 33 may have openings 35 for admitting air inside the housing 32.

The motor is preferably an electric motor, and the drive linkage 29 is connected between this motor and the burner tube. The drive linkage 29 is preferably a gear reduction unit to reduce the speed of the motor 28 relative to that of the burner arm 19. The drive linkage 29 includes a driven gear 36 fixed on the short arm 21 of the burner tube 19. This driven gear is hollow and is centered on an orifice spud 37 which emits gas into the burner tube through the bearing 22. The hollow driven gear 36, therefore, also acts as a radial bearing for support of the burner tube 19. The burner tube 19 may be lifted out of the bearing 22 for cleaning purposes, if necessary. The burner tube short arm 21 has an aperture 38 for primary air, and the air openings 12 provide secondary air for the gas flame emitting from the burner ports 24.

The orifice spud 37 is connected to a gas fitting 39 mounted on the enclosure plate 33. A gas valve 41 controls flow of gas to the fitting 39 from a gas source 42, which may be a gas line or a portable container, such as for propane. Preferably, the valve 41 is a multiple-position valve controlled by a knob 43 with full ON, half, quarter, and OFF positions.

The variable means 30 which varies the effective cooking area includes generally stop means 46 which are at different locations around the periphery of the support pan 11 and have variable conditions. One of these stop means is shown enlarged in FIGS. 5-8. In FIGS. 7 and 8, the stop 46 is shown in the active condition, and in FIGS. 5 and 6 is shown in the inactive condition. This stop 46 is a means to stop rotation of the burner tube 19 and to effect rotation in the opposite direction. By this means, by establishing the active or inactive condition of the stops at the nine o'clock, twelve o'clock, and three o'clock positions of FIG. 1, one may select either one-fourth, one-half, three-quarter, or 358-degree oscillating arcuate movement or continuous rotation in one direction. In more detail, the variable means 30 shown in FIGS. 5-8 includes a sheet metal plate 48 which is secured to the side wall of the pan support 11 by any suitable means, such as rivets 49. The upper portion 50 and the lower portion 51 extend inwardly toward the axis 14. A midportion 52 of the plate 48 forms a U-shaped channel for a guide and bearing of the midportion 54 of the rodlike stop 46. This stop 46 has an upper arm 55 and a depending arm 56, and it is this depending arm 56 which extends into the path of the burner tube 19 in the active position shown in FIGS. 7 and 8. A small foot or handle 57 is on the lower end of the midportion 54 and extends outwardly through an aperture 58 in the side wall of the pan support 11. This handle may be grasped and the stop means 46 lifted until the upper arm 55 is above a projection 59 on the upper portion 50 of the plate 48 Then the handle 57 may be turned through a 90-degree arc to change between the conditions of FIGS. 5 and 7, and then gravity will lower the stop means 46 into the selected position of either FIG. 5 or FIG. 7. In the active condition of FIG. 7, the upper arm 55 rests in a notch 60 in the plate upper portion 50, and this combined with the guide and bearing portion 52 holds the stop 46 in the active condition as the burner tube 19 strikes it from either direction.

In the operation of the cooking grill assembly 10, if one has only a small amount of food to be cooked, it can then be placed in the sector between twelve o'clock and three o'clock and the stop means 46 at these two locations moved into the active condition by lifting the stop handle 57 in the position of FIG. 5 and rotating the handle to the position shown in FIG. 7 and then allowing the stop means to drop into the notch 60. This will place the stop arm 56 in the path of movement of the end of the burner tube 19 so that it will oscillate between these two positions through about a 90-degree arc. The motor 28 is preferably an electric motor, and preferably is an alternating voltage permanent magnet and bidirectional motor. Such motor need only have a very small power output, e.g., a 10-watt output, and then the speed reduction of the drive linkage 29 may have a large speed reduction, e.g., 300:1 or 1000:1, to provide relative oscillation between the burner tube 19 and the grill 16. In this embodiment, it is the burner tube 19 which moves. This may be made from light-weight aluminum so that the mass and inertia are quite low and easy for the small power output motor 28 to move. If this is a 3600 rpm motor, on 60 Hertz power, this will be a two-pole motor, and typically the two poles are diametrically opposite on the rotor. When the burner tube 19 hits one of the stop means 46, this will stall the motor 28 as soon as all of the lost motion is taken out of the drive train. When the motor stalls, this absorption of the lost motion is somewhat elastic, which tends to give an acceleration of the motor in the opposite rotational direction. The end result is that the motor does accelerate and run in the opposite direction to drive the burner tube back to the other active stop. By this means, the burner tube 19 oscillates back and forth between the selected active stops so as to vary the effective area of the heat source relative to the food being cooked, and hence the heat source is limited to substantially the given area of the grill on which the food is placed.

If the active stops are selected at the nine o'clock and three o'clock positions, for example, then the burner tube 19 will oscillate to about a 180-degree arc. If the active stops are selected at the twelve o'clock and three o'clock positions when the burner tube is outside of this arc, the burner tube will be limited to about a 270-degree rotation. If only one of the stops is placed in the active condition, the burner tube will have about a 358-degree rotation before it is reversed. As an alternative, all of the stops may be placed in the inactive position and the motor will then drive the burner tube in a single direction of rotation continuously.

The multiposition gas valve 41 may have positions such as full ON, one-half, one-fourth, and OFF, in order to cooperate with the selected percentage of area of the grill on which food is being cooked. The remainder of the grill may be used for other items of food which are to be kept warm but not really cooked.

Although the burner tube 19 is always in motion, the proximity of the orifice spud 37 to the burner tube opening on the axis 14 remains constant for a uniform gas flow and uniform flame. The gas consumption of this grill is at least 50% less than grills with comparable grid area. This is accomplished by the close proximity of the burner flame to the food being cooked and the elimination of the secondary heating masses, sometimes called "lava rocks," which must be heated to temperature before the food can be cooked.

Figure 9:
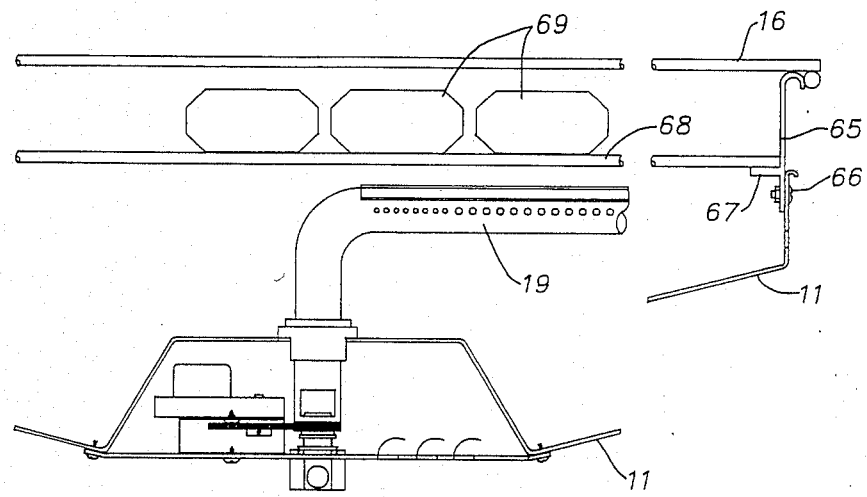
FIG. 9 is a partial cross-sectional view of a second embodiment.

If the secondary heating masses are desired, then FIG. 9 illustrates an extension rim 65 which may be secured by fasteners 66 to the support pan 11. The upper edge of the extension rim 65 supports the cooking grill 16 and a shelf 67 supports a supplementary grill 68 to carry the secondary heating masses 69. Therefore, if a person desires the use of these so-called lava rocks, they may easily be used with this cooking grill assembly.

Figure 10:
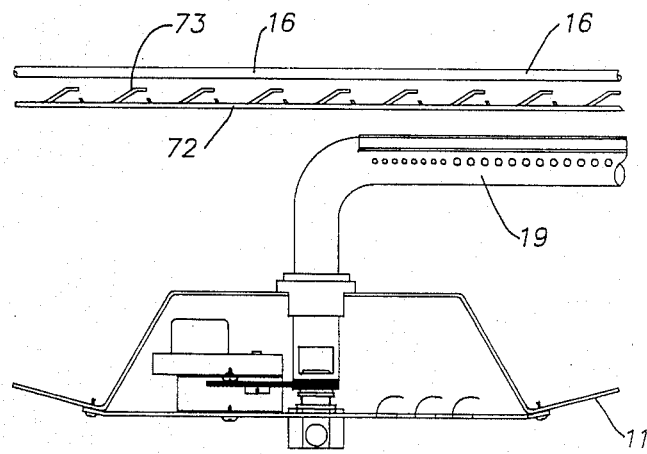
FIG. 10 is a partial sectional elevational view of a third embodiment.

FIG. 10 illustrates a further modification wherein the support, such as the shelf 67, may support a grease baffle 72 with louvers 73. This can prevent drippings from the food being cooked from dropping onto the burner tube 19 or into the support pan 11.

The cooking grill assembly 10 provides a low cost and energy-efficient gas grill compared with many of the prior art which had a gas burner commensurate in size with the size of the cooking grill. The burner ports 24 may be in close proximity to the food being cooked, but since the burner tube 19 is in constant motion, there is no burning of the food and the gas consumption is much less than with prior art assemblies. The heat source is limited to that area of the grill on which the food is to be cooked, and this results in the highly energy-efficient cooking grill assembly of the present invention.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A cooking grill assembly comprising, in combination:

a support having an axis;

a grill carried relative to said support;

a heat source carried relative to said support adjacent said grill and extending substantially perpendicularly to said axis to cooperate with any food on said grill;

a bearing on said support substantially coaxial at said axis;

the food to be cooked on the grill adapted to be disposed on a given area less than 100% of the area of the grill;

means to limit the heat source to substantially said given area of said grill;

said limiting means including a motor, drive linkage and variable means;

said drive linkage connecting said motor to rotate one of said heat source and said grill in said bearing; and said variable means varying the effective area of cooperation of said heat source to said given of said grill and including variable position means to stop rotation of said one of said heat source and said grill and effect rotation in the opposite direction.

2. A cooking grill assembly as set forth in claim 1, wherein said heat source is a gas burner tube with ports to emit gas for a flame.

3. A cooking grill as set forth in claim 2, including a multiposition gas valve connected to control the amount of gas flow to said burner tube.

4. A cooking grill as set forth in claim 2, wherein said gas burner tube is L-shaped with long and short legs, said short leg being journaled in said bearing and said long leg having said ports and being said heat source.

5. A cooking grill as set forth in claim 2, wherein said burner tube is journaled in said bearing.

6. A cooking grill as set forth in claim 2, including means establishing gas flow through said bearing to said gas burner tube.

7. A cooking grill as set forth in claim 2, wherein the burner ports closest to said axis are smaller than those burner ports remote from said axis.

8. A cooking grill as set forth in claim 2, wherein said axis is substantially vertical.

9. A cooking grill as set forth in claim 8, wherein said burner ports are on one vertical side of said burner tube.

10. A cooking grill as set forth in claim including a drip shield on said burner tube to keep drippings from the food being cooked from fouling said burner ports.

11. A cooking grill as set forth in claim 1, including support means between said heat source and said grill to support secondary heating masses.

12. A cooking grill as set forth in claim 1, including support means between said heat source and said grill to support an apertured grease collecting baffle.

13. A cooking grill as set forth in claim 1, wherein said motor is reversible.

* * * * *

UNITED STATES PATENT AND TRADEMARK OFFICE
CERTIFICATE OF CORRECTION

PATENT NO. : 4,805,587

DATED : February 21, 1989

INVENTOR(S) : Ronald D. Schweitzer

It is certified that error appears in the above-identified patent and that said Letters Patent is hereby corrected as shown below:

Column 3, line 50 after "48" insert --.--.

Column 6, line 5 after "given" insert --area--.

Column 6, line 31 after "claim" insert --8,--.

Signed and Sealed this

Thirtieth Day of April, 1991

Attest:

HARRY F. MANBECK, JR.

Attesting Officer

Commissioner of Patents and Trademarks